United States Patent
Tallet et al.

(10) Patent No.: US 8,354,621 B2
(45) Date of Patent: Jan. 15, 2013

(54) GLASS-CERAMIC PLATES, THEIR MANUFACTURING PROCESS, AND COOKTOPS EQUIPPED WITH THESE PLATES

(75) Inventors: Laurent Tallet, Montcourt Fromonville (FR); Carol Dumont, Nemours (FR); Helene Harmand, Paris (FR); Bertrand Charpentier, Greer, SC (US)

(73) Assignee: Eurokera S.N.C., Chateau-Thierry (FR)

( * ) Notice: Subject to any disclaimer, the term of this patent is extended or adjusted under 35 U.S.C. 154(b) by 1177 days.

(21) Appl. No.: 12/159,211

(22) PCT Filed: Jan. 8, 2007

(86) PCT No.: PCT/FR2007/050619
§ 371 (c)(1),
(2), (4) Date: Jun. 26, 2008

(87) PCT Pub. No.: WO2007/080343
PCT Pub. Date: Jul. 19, 2007

(65) Prior Publication Data
US 2008/0290082 A1    Nov. 27, 2008

(30) Foreign Application Priority Data
Jan. 16, 2006   (FR) .................................... 06 50133

(51) Int. Cl.
*H05B 3/68*    (2006.01)

(52) U.S. Cl. .............................. 219/452.11; 219/460.1
(58) Field of Classification Search .... 219/443.1–468.2; 451/49, 51; 101/5–7, 48–51
See application file for complete search history.

(56) References Cited

U.S. PATENT DOCUMENTS

| | | | | |
|---|---|---|---|---|
| 5,261,387 A | * | 11/1993 | Gressenich | 126/39 H |
| 5,512,005 A | * | 4/1996 | Gulling | 451/29 |
| 6,150,636 A | * | 11/2000 | Bogdanski et al. | 219/461.1 |
| 6,492,624 B2 | * | 12/2002 | Kosmas et al. | 219/460.1 |
| 6,604,457 B2 | * | 8/2003 | Klug | 101/32 |
| 7,208,703 B2 | * | 4/2007 | Shimatani et al. | 219/443.1 |
| 7,375,307 B2 | * | 5/2008 | Vilato et al. | 219/452.11 |

FOREIGN PATENT DOCUMENTS

| | | |
|---|---|---|
| DE | 90 10 072 | 9/1990 |
| DE | 103 60 593 | 1/2005 |
| EP | 1 357 089 | 10/2003 |
| FR | 2 074 775 | 10/1971 |
| WO | 2005 035452 | 4/2005 |

* cited by examiner

*Primary Examiner* — Sang Paik
(74) *Attorney, Agent, or Firm* — Oblon, Spivak, McClelland, Maier & Neustadt, L.L.P.

(57) ABSTRACT

A glass-ceramic plate, and production methods and apparatuses in relation to the plate. The plate is designed for example to equip a cooktop, and includes, on at least one of its faces, a differentiated surface finish formed in the body of the bare glass-ceramic plate.

16 Claims, 2 Drawing Sheets

GLASS-CERAMIC PLATES, THEIR MANUFACTURING PROCESS, AND COOKTOPS EQUIPPED WITH THESE PLATES

The present invention relates to hotplates made of glass-ceramic or of another similar high temperature resistant material and having a coefficient of expansion that is zero or nearly zero.

These plates, which are flat or substantially flat, are designed to cover heating elements (or heaters or burners) in order to constitute cooktops. Heating elements are of various types, in particular: electrical heating elements, such as electrical resistance heating elements or radiant elements or halogen lamps; inductors or induction elements for induction heating; and gas burners. Heating elements of the same cooktop can be of the same type or of different types, such as radiant elements and gas burners, inductors and gas burners, radiant elements and inductors, etc. (cooktops termed "hybrid").

Cooktops also include control and regulating means, making it possible to vary the power of the heaters (which most of the time are four in number) and possibly various warning lights.

These hotplates made of glass-ceramic or the like have been an immense success and are very widespread, in particular since they benefit from an external appearance that is more modern than traditional electric plates and are easy to clean on account of the fact that the surface of a glass-ceramic plate is flat or substantially flat.

"Substantially flat" is understood to mean that the glass-ceramic plate is flat but can also have deformations in some places consisting in particular of cavities or hollow zones, or of embossed or raised areas or corrugations, these deformations being generally obtained by deforming flat plates leaving the melting furnace or by reworking, for example by folding or bowing before ceramization, or sagging, (natural or assisted) during ceramization, etc.

Mention may in particular be made of plates of the type described in French patent application FR-A-2 773 873 that have at least one cavity under which a heating element is placed, it being possible for the upper peripheral edge of the concavity to be in addition raised in relation to the plane of the plate. Plates may also be mentioned according to EP-A-0 930 806 which have hollows and raised portions making it possible for a non-sighted user to locate by touch a particular zone and/or function of the plate, or plates according to WO 01/38796 which possess deformed parts constituting the high parts of gas burner combustion chambers, these deformed parts having slots for flames to leave and air to enter.

In order to produce controlling and regulating means enabling the power of the heating elements to be varied, traditional knobs attached to spindles passing through holes made in the plate are now generally replaced by electronic sensitive keys or capacitive keys, actuated by contact with the finger. The controlling and regulating means for a heating or temperature-maintaining means consist in particular of one or more pairs of keys, one of which serves to increase the power delivered to the associated hob each time the user's finger contacts this key, whereas on the other hand the other serves to reduce the power of this same hob in steps. A multiplicity of keys may also be provided corresponding to separate heating power levels.

In addition, glass-ceramic plates generally have a lower surface provided with studs so as, in particular, to improve the mechanical strength of the plate and to limit vision inside the casing while preventing, where necessary, the user from being dazzled during use. The upper surface preferably remains smooth in order, where required, to provide good contact with the cooking utensils and to transfer heat under the best conditions and for ease of cleaning and for aesthetics.

The production of glass-ceramic plates generally comprises the following steps:

melting-calendering: the glass with a chosen composition is melted in a melting furnace so as to form the glass-ceramic, and the molten glass is then calendered into a standard strip or sheet by passing the molten glass between two calendering rollers, generally an upper roller with a smooth surface with the aim of obtaining a smooth upper surface for the plate and a lower negatively engraved roller, so as to obtain a lower surface of the plate provided with a network of raised portions or studs, which are for example hemispherical or semielliptical;

cutting the glass strip to the desired dimensions; as a general rule two plates are cut from the same strip;

ceramization: the cut plates are fired (and if needs be previously covered with decorative and/or functional zones) according to the thermal profile chosen to convert the glass into a polycrystalline material called "glass-ceramic" of which the coefficient of expansion is zero or virtually zero and which withstands thermal shock that can rise to 700° C., while baking, if required, all or part of the coating (for example, enamel), thus enabling it to be attached to the substrate; and when required, coating with one or more layers and/or functional zones and/or decorative zones, before and/or after ceramization according to the type of coating.

In the case where the glass-ceramic plate includes shaped (raised or hollowed) zones, the production method would include an operation, which can be carried out at any moment in this conventional method, of sagging, moulding or pressing with the use of a support or of moulding or pressing surfaces having the desired geometry, provided that the material of which the plate is made is at a sufficiently high temperature to permit plastic deformation.

More recently, glass-ceramic plates without studs on the lower surface have also been proposed, making it possible to widen the range of traditional products, these plates having a more functional appearance through a paint coating or reflecting layer (obtained with effect pigments for example) advantageously on the underside, in this way making it possible to produce aesthetically contrasting zones (matt/glossy contrast, speckled or dotted effect, etc.). Such plates are the subject in particular of French patent application No. 05/53709 filed on Dec. 5, 2005.

While carrying out its research, the Applicant company discovered that such a more functional and aesthetic appearance, sought after in accordance with the aforementioned patent application, could be obtained more simply than by the application of various layers on the glass-ceramic plate.

It has indeed shown that it is possible to produce glass-ceramic plates whose base (or reference) surface finish can be modified by acting on the glass itself (action within the body or in the bulk) during the production of the plate, and without a supplementary operation: such a modification is obtained by transfer of a differentiated surface finish (advantageously a slight differentiation as previously stated) created on one or both of the calendering rollers, to the surface of the glass strip leaving these rollers.

While seeking a solution to the previous problem presented, the Applicant company has thus developed a novel method making it possible to obtain more easily a contrast of the matt-gloss or satin-gloss type without a supplementary costly or complex operation and without risk of damaging or forming microfractures on the surface of the glass-ceramic (risks that could result from treatments, in particular in the glass-ceramic plate, carried out subsequently after production of the glass-ceramic) and therefore without embrittling this, which could thus preserve its mechanical properties and ease of cleaning, no porosity being moreover formed which could give rise to the attachment of fats or leave finger marks.

The region or regions hot-printed in this way on the ceramic plate by a surface or part of a surface of a calendering roller undergo, after calendering and then during ceramization, changes leading to a very special appearance with asperities but without any porosity, which is imperceptible or practically imperceptible to the touch but which makes it possible to obtain contrasted appearances so as to form a decoration or to give information without impairing the ease of cleaning and the good distribution of heat of the plate.

It is self-evident that impressions on the glass-ceramic plate, obtained according to the present invention, can also be combined with any known marking means: enamel, paint, reflecting layer, etc. as well as with the presence of studs, it thus being possible to provide a considerable number of effects that are attractive for the consumer, while preserving the required mechanical properties.

The present invention relates to all the types of plates that have just been described, which could where necessary have drillings and/or possibly raised portions and/or hollows, from the moment when they are overall flat or mainly flat.

The subject of the present invention is therefore a glass-ceramic plate (generally flat or substantially flat), said plate being for example designed to equip a cooktop, characterized in that it comprises, on at least one of its faces, at least one differentiated surface finish, said differentiated surface finish being formed in the body (or bulk) of the (bare) glass-ceramic (plate) itself.

A differentiated surface finish is understood to mean that the plate has at least one zone with a contrasted appearance compared with the usual smooth appearance of glass-ceramic plates, it being possible for this differentiated surface finish relative to the basic smooth surface of the glass-ceramic to result, for example, in a satin, matt, or filigree effect, etc. The differentiated surface finish formed on one face of the plate may cover all or virtually all said face. It could also and preferably cover one or more zones of said face, forming for example a decoration, in particular with patterns and/or information (logo, trademark, symbol etc.) and/or marking the location of functional elements etc. The differentiated surface finish can also be intended to contribute to masking subjacent elements at rest or permitting the detection of heating elements and any displays when they are in service, etc.

The differentiated surface finish in relation to a smooth surface can also be to a certain extent smooth or uniform (in particular undetectable to the touch in relation, where appropriate, to the smooth remainder of the surface of the plate) while however presenting a differentiated appearance (advantageously at least visually detectable). In particular, the differentiated surface finish may preferably result from microroughnesses without sharp angles, constituting zones which are more diffusing than smooth zones, it being possible for these zones to be imperceptible to the touch, while being perceptible visually at certain inclination angles of the plate, on account of the fact that they have microscopic microroughness variations.

Generally, the plate according to the invention has, in at least one face (generally its upper face), at least one smooth background zone (having a conventional smooth surface finish) and at least one zone with a differentiated surface finish (in relation to said smooth surface) according to the invention, forming an indicator zone and/or a decorated zone, or conversely has a differentiated background zone in relation to the smooth information and/or decorated zone.

According to an advantageous embodiment of the present invention, the differentiated surface finish has, in relation to the smooth surface (or to a normal smooth surface) a difference in height (or in levels) of less than 1 mm, preferably less than 500 µm and in a particularly preferred manner less than 5 µm (for example of the order of 1 to 5 µm), so as in particular not to disturb the heating uniformity, to prevent the formation of stops for cooking utensils and to prevent any deposition of dirt etc.

Also preferably, the mean (or average) roughness $R_a$ of the differentiated surface finish is chosen so as to be equal to at least 1.5 times, and at most 5 times, the mean roughness $R_a$ of the smooth surface (the mean roughness $R_a$ is defined as the arithmetic average (or mean) of deviations of the filtered roughness profile, of the average line within the measuring track or evaluation length, according in particular to standard ISO/DIN 4287/1).

As subsequently described, the differentiated surface finish (or as the case may be, this particular roughness) is advantageously obtained hot as the plate is produced, by application to the surface thereof of an element bearing the desired surface finish engraved as a negative and is obtained in particular during hot calendering of molten glass between two calendering rollers of which the original smooth surface has been modified in order to bear the engraved differentiated surface finish as a negative in order to form said surface finish by transfer from the roller onto the corresponding surface of the plate.

Preferably, the differentiated surface finish is chosen to be imperceptible to the touch and/or the differentiated surface finish is such that it is not sensitive to soiling and/or it does not leave finger marks.

As previously indicated, the glass-ceramic plate according to the invention may possibly have studs on its lower face. Also, it may have, on at least part of one of its faces, at least one coating of a paint and/or of an enamel and/or of a reflecting layer, etc.

The present invention also relates to a method (or process) for producing glass-ceramic plates as defined above, wherein calendering of molten glass (as a strip or sheet) is carried out by passing the molten glass between calendering rollers, at least one of which has been modified to have, engraved as a negative, the desired differentiated surface finish (for the face of the glass-ceramic plate which corresponds thereto) so as to obtain said differentiated surface finish by transfer onto the material in the form of a sheet or strip.

This particular calendering can be installed in usual methods for producing glass-ceramic plates without changing or disturbing other treatment steps. As a reminder, calendering is included, in particular, in the following steps: glass with the appropriate composition chosen to form the glass-ceramic is melted in a furnace, and then the molten glass is calendered into a standard strip or sheet and the glass strip is cut to the desired dimensions. The plates obtained are then ceramized in a known manner, ceramization generally comprising a step of progressively raising the temperature to the nucleation domain, generally situated close to the transformation domain of the glass, a step in which the nucleation interval is crossed in several minutes, a new progressive rise in temperature up to the temperature of the ceramization plateau, maintenance of the temperature of the ceramization plateau for a few minutes, and then rapid cooling (down) to ambient temperature.

The process then generally comprises another cutting operation, possibly followed by a shaping operation (grinding, bevelling, etc.). The method also generally incorporates decorating operations (for example, by screen printing, spraying, etc.) it being possible for these operations to take place, according to the case, before and/after ceramization.

The invention also relates to an apparatus (or device) for producing a glass-ceramic plate as defined above, this apparatus comprising a calendering device (or unit) consisting of at least an upper roller and a lower roller (between which the molten glass to be calendered is passed) characterized in that at least one roller has been modified so as to have, engraved as a negative, the desired differentiated surface finish (for the face of the glass-ceramic plate which corresponds thereto).

Modification of the surface finish of a roller can in particular have been carried out by grit-blasting (or sandblasting or satin finishing) in particular with the aid of alumina grains of the corundum type and/or glass beads, with a particle size for example of the order of 10 to 500 μm (for example an average of 150 μm), the desired surface finish being determined in particular by the nature and particle size of the grit-blasting material, the speed of rotation of the roller during grit blasting and the duration of the latter. In the case where the differentiated surface finish is formed only on parts of the roller, these are for example delimited by cut-outs made in a stencil sheet surrounding the roller.

The invention also relates to a method for producing a calendering roller designed to equip the apparatus as defined above, characterized in that a cylindrical (generally metal) roller with a smooth surface is taken, this roller being covered (or surrounded) by at least one stencil sheet (generally self adhesive) having cut-outs corresponding to the locations where grit-blasting is to be carried out (the stencil sheet can also possibly be coated with at least one outer protective paper, that is removed before grit-blasting and/or be positioned on a first support paper, bursting during grit-blasting in the places where there are cut-outs covering the roller, and/or the roller can be treated directly without a stencil sheet over all its surface), the roller is rotated about its axis (at a rate for example of 50 to 200 revolutions per minute) and the grit-blasting material is projected simultaneously (with the aid for example of a nozzle supplied with compressed air at a pressure in particular of the order of 2 to 5 bar) along a generatrix of said roller. The apparatus for projecting the grit-blasting material is preferably movable in translation, at a rate in particular of the order of 0.01 to 1 m/min, preferably from 0.05 to 0.5 m/min, in order to carry out passes or backward and forward movements over all the length of the roller, for a period of the order of 1 to 100 minutes (for example of the order of 20 minutes).

After grit-blasting, the coating is removed (stencil sheet and as the case may be fragments of other sheets such as inner sheet) and the roller is washed (for example with alcohol).

The present invention also relates to a cooktop (or cooking apparatus or cooker), in particular of the type with radiant elements, halogen elements, induction elements, gas burners or mixed type elements, said cooktop being equipped with a glass-ceramic plate as defined above.

In order better to illustrate the object of the present invention, particular embodiments thereof will now be described with reference to the appended drawings in which.

Figure 1:
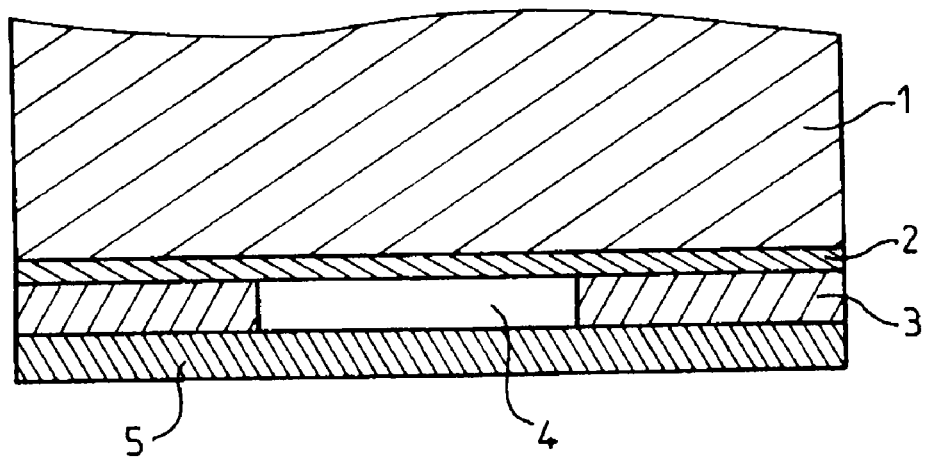
FIG. 1 is a diagrammatic view in partial section of an upper calendering roller, at the periphery of which a stencil device is applied with a view to modifying parts of its surface by grit-blasting.

FIG. 1 shows a fragmentary view of a calendering roller 1 with a smooth surface, around which the following sheets (shown in the figure deliberately enlarged) are positioned successively with a view to grit-blasting:
- a very thin inner sheet 2 (for protection or attachment, it being possible for this sheet to be removed in order to apply the stencil sheet directly onto the glass) that does not withstand grit-blasting;
- a self-adhesive stencil sheet 3 made of paper, plastic or rubber, withstanding grit-blasting and having cut-outs 4; and
- a peelable outer protective sheet 5 that is removed before grit-blasting.

The roller 1 is a cylindrical metal roller, for example 1 to 2 m long and with a diameter of 10 to 50 cm. The sheets 2, 3 and 5 are rolled over all it length.

In order to carry out grit-blasting, a grit consisting in particular of corundum with a particle size of the order of 150 μm is projected onto the roller 1 provided with the sheet 3 (and as the case may be, the sheet 2). The pressure of the grit jet leaving through a nozzle supplied with compressed air is of the order of 4 bar, the roller 1 rotates at approximately 120 revolutions per minute and the nozzle is moved backwards and forwards along the roller at a speed of 0.05 to 0.5 m/min (for example 1 pass every 20 minutes, each forward and backwards movement constituting one pass). In approximately 4 to 15 passes, the formation of a surface finish termed satin is formed over the parts of the roller 1 situated facing the cut-outs 4.

During grit-blasting, the very thin sheet 2 bursts in the locations corresponding to the cut-outs 4.

Once grit-blasting has finished, the sheet 3 and the fragments of the sheet 2 are removed and the roller 1 is washed with alcohol.

Figure 3:
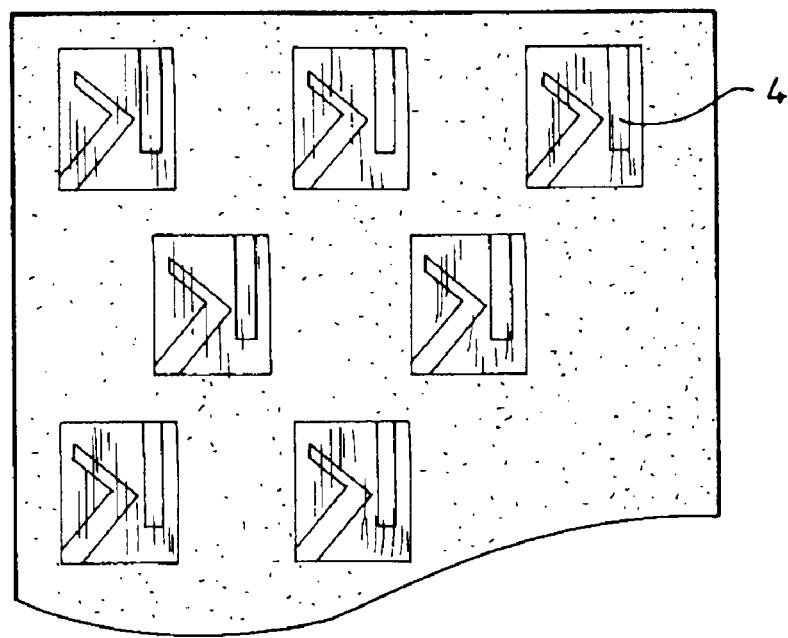
FIG. 3 is a partial view of the stencil sheet applied around the roller of FIG. 1.
Figure 4:
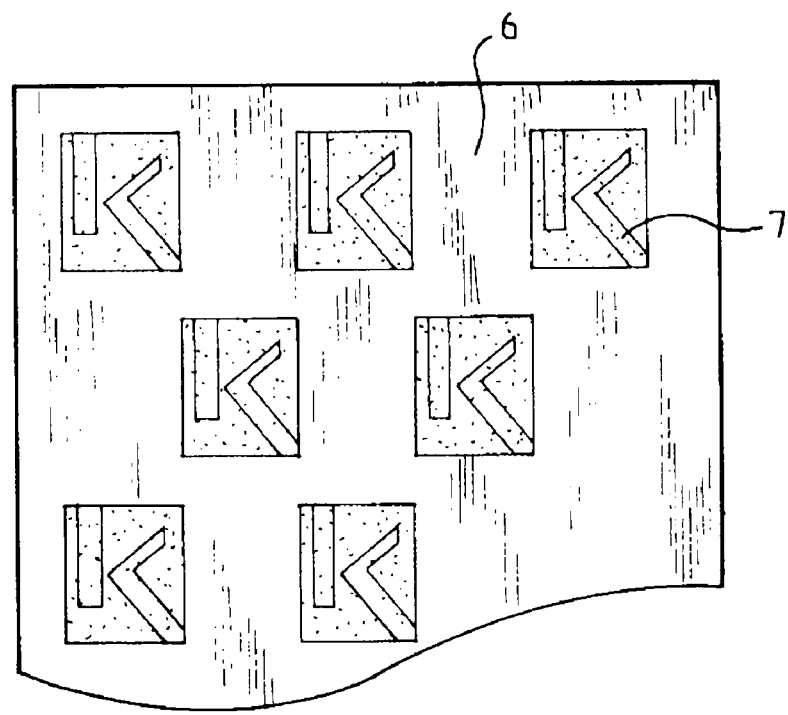
FIG. 4 is partial view corresponding to FIG. 3, of the upper surface of the hotplate having regions with a differentiated surface finish.

In the example shown, the cut-outs 4 (FIGS. 1 and 3) consist of patterns positioned in staggered rows, each having the mirror form of a stylized letter "K", which will lead to the appearance of the glass-ceramic plate shown in FIG. 4 with a smooth background 6 and "K" satin zones 7.

Figure 2:
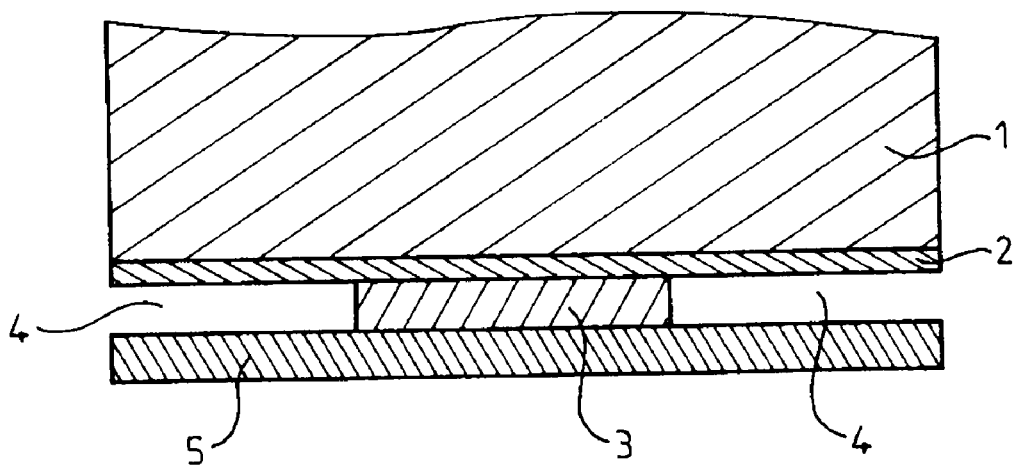
FIG. 2 is a similar view to FIG. 1, the stencil device being made according to a variant.

Another stencil is shown in FIG. 2 which would lead to a glass-ceramic plate having a reverse appearance to that of FIG. 4: a satin background and smooth "K" zones.

A transparent glass-ceramic plate is therefore obtained of which the upper face bears "K" patterns from a glass having for example the composition described in European patent EP 0 437 228, the upper calendering roller being that of FIG. 1 and the lower calendering roller being a conventional roller.

The glass plates are for example ceramized over ceramic grids with a ceramization cycle comprising the following steps:
- temperature rise at the rate of 50-80° C./minute to the nucleation domain, generally situated in the region of the transformation domain of the glass;
- passage through the nucleation range (670-800° C.) over about twenty minutes with the temperature held for several minutes;
- temperature rise over 15 to 30 minutes to the temperature T of the ceramization plateau of the order of 900-960° C.;
- maintaining the temperature T of the ceramization plateau for a time t of the order of 10-25 minutes;
- rapidly cooling to ambient temperature.

It should be understood that the special embodiments described above have been given as an indication and are not limiting and that modification and variants can be provided without for all that departing from the scope of the present invention.

The plates according to the invention can in particular be used with advantage for producing a novel range of hotplates for cookers or cooktops.

The invention claimed is:

1. A glass-ceramic plate comprising:
   at least one differentiated surface finish on at least one face of the glass-ceramic plate, the differentiated surface finish being formed in a body of a bare glass-ceramic,
   wherein a mean roughness $R_a$ of the differentiated surface finish is equal to at least 1.5 times, and at most 5 times, a mean roughness $R_a$ of a smooth surface of the glass-ceramic plate.

2. A glass-ceramic plate according to claim 1, wherein the differentiated surface finish includes microroughnesses without sharp angles.

3. A glass-ceramic plate according to claim 1, wherein the differentiated surface finish includes, in relation to the smooth surface of the glass-ceramic plate, a difference in height of less than 1 mm.

4. A glass-ceramic plate according to claim 1, wherein the differentiated surface finish is a hot-printed surface, obtained as the glass-ceramic plate is produced during hot calendering of molten glass between two calendering rollers, at least one of which an original smooth surface has been modified to bear an engraved negative of the differentiated surface finish, and the differentiated surface finish is a mirror image of the negative that is transferred from the at least one of the two calendering rollers onto a corresponding surface of the molten glass.

5. A glass-ceramic plate according to claim 1, wherein the differentiated surface finish is imperceptible to touch.

6. A method for producing glass-ceramic plates as defined in claim 1, comprising:
   calendering of molten glass by passing the molten glass between calendering rollers, at least one of which has been modified to include a surface engraved with a negative of the differentiated surface finish, and
   transferring the negative so as to obtain the differentiated surface finish on the molten glass in a form of a sheet or strip.

7. An apparatus for producing a glass-ceramic plate as defined in claim 1, the apparatus comprising:
   a calendering device including at least an upper roller and a lower roller, wherein at least one of the upper and lower rollers has been modified so as to include a surface engraved with a negative of the differentiated surface finish.

8. The apparatus according to claim 7, wherein a surface finish of at least one of the upper and lower rollers is grit-blasted or sandblasted or satin finished, with aid of a blasting material of alumina grains of the corundum type and/or glass beads, with a particle size on an order of 10 to 500 µm.

9. A method for producing a calendering roller designed to be fitted to the apparatus as defined in claim 8, comprising:
   taking a cylindrical roller with a smooth surface, the roller being covered with at least one stencil sheet including cut-outs corresponding to locations where grit-blasting is to be carried out,
   rotating the roller about its axis, and
   simultaneously with the rotating, projecting the blasting material along a generatrix of the roller.

10. A cooktop, comprising:
    radiant elements, halogen elements, induction elements, gas burners, or mixed type elements, and
    a glass-ceramic plate as defined in claim 1.

11. A glass-ceramic plate according to claim 1, wherein the differentiated surface finish includes, in relation to the smooth surface of the glass-ceramic plate, a difference in height of less than 500 µm.

12. A glass-ceramic plate according to claim 1, wherein the differentiated surface finish includes, in relation to the smooth surface of the glass-ceramic plate, a difference in height of less than 5 µm.

13. A glass-ceramic plate according to claim 1, wherein the differentiated surface finish includes a satin, matte, or filigree effect.

14. A glass-ceramic plate according to claim 1, wherein the differentiated surface finish includes asperities but without any porosity.

15. A glass-ceramic plate according to claim 1, wherein the mean roughness $R_a$ is defined as an arithmetic average of deviations of a filtered roughness profile, of an average line within a measuring track or evaluation length, according to standard ISO/DIN 4287/1.

16. A glass-ceramic plate according to claim 1, wherein the differentiated surface finish is provided on an upper face of the glass-ceramic plate.

* * * * *